July 30, 1968  J. E. HECKETHORN  3,394,741
WOVEN WIRE MESH SEPARATING

Filed Nov. 18, 1965  3 Sheets-Sheet 1

INVENTOR,
JOHN E. HECKETHORN
BY Watson, Cole, Grindle & Watson
ATTORNEYS

INVENTOR,
JOHN E. HECKETHORN

July 30, 1968   J. E. HECKETHORN   3,394,741
WOVEN WIRE MESH SEPARATING

Filed Nov. 18, 1965   3 Sheets-Sheet 3

INVENTOR,
JOHN E. HECKETHORN

BY Watson, Cole, Grindle & Watson
ATTORNEYS

United States Patent Office 3,394,741
Patented July 30, 1968

3,394,741
WOVEN WIRE MESH SEPARATING
John E. Heckethorn, Dyersburg, Tenn., assignor to Heckethorn Manufacturing Co., Dyersburg, Tenn., a corporation of Colorado
Filed Nov. 18, 1965, Ser. No. 508,428
14 Claims. (Cl. 140—107)

ABSTRACT OF THE DISCLOSURE

The method and apparatus comprising the present invention involve the unwinding of adjacent pairs of coiled wire from a continuous mesh web to separate from said web successive sections for use in constructing pads for seat cushions, for example. These pairs of coils are connected by the intertwisted opposite wire ends thereof, and the first step of separation is accomplished by shearing the twisted ends upon one side of the web at points inwardly of the twists where the wire of the respective coils converge. Then, by means of a recessed double hooked tool, the opposite still intertwisted end of the dual coiled element is seized and the tool retracted while rotating the coiled element, thus unwinding it from the adjacent coils of the web and the severed section. The rotary tool is carried by a horizontally reciprocating carriage which reverses at each end of its travel, one where the tool grasps the coil end and the other where the extracted dual coiled element is fully released and allowed to fall in a suitable receptacle.

The actuation of the apparatus is preferably effected by means of fluid pressure, and means are provided for accurately guiding the carriage in its traversal movements. Transmission means are provided for so relating the rotary speed of the extracting tool to the traverse of the carriage that the rate of withdrawal or unwinding of the coiled element is properly related to the pitch of the wire coils of the mesh.

---

This invention relates generally to the manufacture of woven wire mesh articles of definite predetermined length, and more particularly to means and methods for separating a continuous chain link mesh structure into smaller sections or units of mesh of appropriate lengths.

The general object of the invention is the provision of a novel method of severing smaller units or sections from a continuous chain link woven mesh web, and of novel and improved mechanism for rapidly and efficiently effecting such separation.

Those familiar with the art are aware of certain known methods of weaving chain link fencing by winding flat coils of wire on a relatively flat mandrel and spirally threading successive coils, as they come off of the mandrel, onto the next preceding coil of the web being built up.

Novel methods and apparatus have been evolved and adapted to the manufacture of other mesh structures, and among these is to be noted the spring pad insert for automobile seat cushions which comprises the subject matter of my co-pending application Ser. No. 476,866, the original of which was filed Aug. 25, 1964.

Although the general principles of my present invention may be applied to the severance of units of mesh from continuous webs of a wide variety of types, they are particularly applicable to the separation of units or sections of seat cushion size from prepared continuous webs of wire, the wire being of relatively small gauge and of somewhat limited strength; and the invention embodies novel features particularly pointed toward the solution of problems presented by the light gauge wire wound in coils of the rather severe rectangular configuration described in my prior application.

In many mesh or chain link web structures the ends of pairs of adjacent coils are brought together at the sides of the web and interconnected (in fence practice either by so-called knuckling or barbing). Also in the development particularly pointed toward the manufacture of spring pads for seat cushions as described in my co-pending application, not only are the coils configured in a novel and improved fashion for their particular purposes, but the ends of the pairs of adjacent coils are intertwisted and the flared barbs trimmed off as the web moves forwardly from the weaving machine, and at this stage the web is ready for the successive severance of seat length portions.

Thus the present invention has for its more specific object the provision of means for seizing the intertwisted ends of the coils of appropriately spaced pairs at one side of the web, by a specially designed tool, and removing both coils by spiral or helical movement after the ends of said coils have been cut at the opposite side of the web.

Other novel features include the provision of means for accomplishing the unwinding at a rapid rate without tangling the coils by virtue of a controlled travel of the tool; the disconnection of the unwinding tool from the coil ends by reversal at the end of a run; and novel details of construction and automatic sequential operation of the power driven apparatus involved.

Other objects and features of novelty will be apparent from the following specification when read in connection with the accompanying drawings in which one embodiment of the invention is illustrated by way of example.

In the drawings:

FIGURE 3 is a view in perspective of the operative end of the novel unwinding tool;

Figure 5:
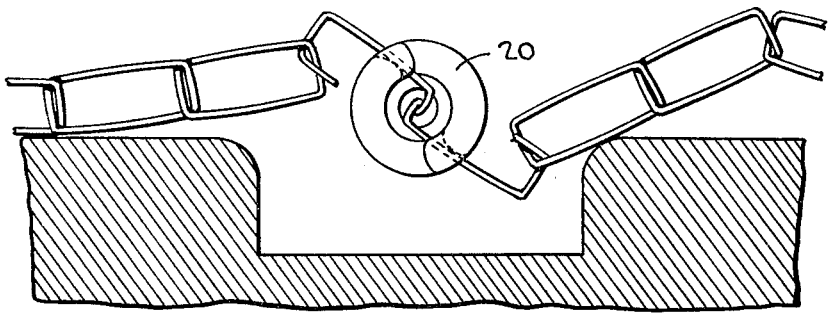
FIGURE 5 is a similar view showing the approximate positions of the parts after about a quarter turn of the tool.

As affording some background information regarding the applicability of the present invention, reference may be made to my above mentioned co-pending application and most particularly to FIGURES 5–10 therein. In FIGURE 5 of that case is shown a portion of a continuous web of wire mesh as it comes from the forming machine where the individual coils 28 have been moved endwise off the mandrel indicated at 128 in FIGURE 10. Each successive coil is interlaced with the preceding coil of the mesh and as each coil is added the mesh is fed forward a corresponding distance.

Succeeding operations twist the projecting wire ends 30 as at 31 and eventually the remaining barbs are snipped off leaving the projecting twists 35 at the ends of each pair of coils.

Figure 4:
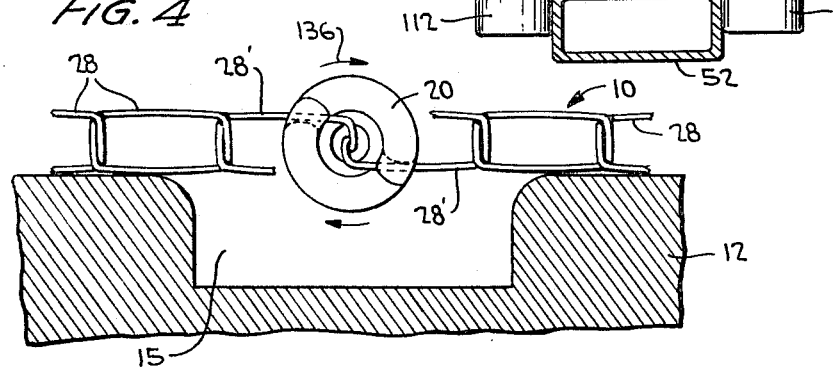
FIGURE 4 is a fragmentary sectional view taken on line 4—4 of FIGURE 1, showing the position of the tool and the mesh at the start of the unwinding run.

Now it is obvious that the continuous web must be cut into sections of definite lengths to fit the frame of the seat cushion as clearly indicated in FIGURE 4 of the copending application, and the present invention is concerned wtih means and methods for accomplishing this separation in a most economical and expeditious fashion. The invention is of course applicable to other types of mesh material, but most appropriately to the product described in my co-pending application wherein certain difficulties might be presented due to the fact that wire of relatively small gauge is involved and that the coils are of rather severely rectangular shape.

Now referring briefly and in a preliminary way to FIGURES 1, 4, 5 and 6 of this present application, the over-all procedure involved here will be described prior to setting forth the detailed steps of the process and the mechanism involved therein.

It may be stated that the web designated generally by the numeral 10 is moved along a bench or table 12 in the direction of the arrow 11, and the forward end of the web positioned against the abutment shoulder 13 provided by the ledge 14 on the table 12. With this as a gauging point, there is provided in the table a transverse trough or groove 15 which is at least as wide as the width of two adjoining coils 28 of the web and of a depth slightly greater than the width of one of the coils 28. The distance from the advance edge of the groove 15 to the abutment shoulder 13 on the table is approximately equal to the length of a section 10A of the web which goes to form one of the seat cushion pads.

The actual severance and unwinding action takes place adjacent the trough or groove 15 on the table and is effected, as will be later described, by means of the unwinding tool 20 which is provided with portions adapted to seize one end of a pair of coils designed 28' above the trough 15.

At the same time the double coil 28' is seized by the tool 20, a shear or knife (hereinafter designated D) serves to sever the opposite end of the double coil, represented by the twist 35' at the point indicated by the broken line 23.

The tool head 20 is not only rotatably mounted but also arranged for withdrawal in the direction of its axis in order to "unscrew" the double coil 28' from the remainder of the web, as will be described in detail. This spiral unscrewing action is illustrated clearly in FIGURES 4 and 5 of the drawings, the position in FIGURE 4 being at the time the tool 20 grasps the double coil 28' and FIGURE 5 showing the position of the parts a moment later after the tool 20 has started its movement.

Figure 6:
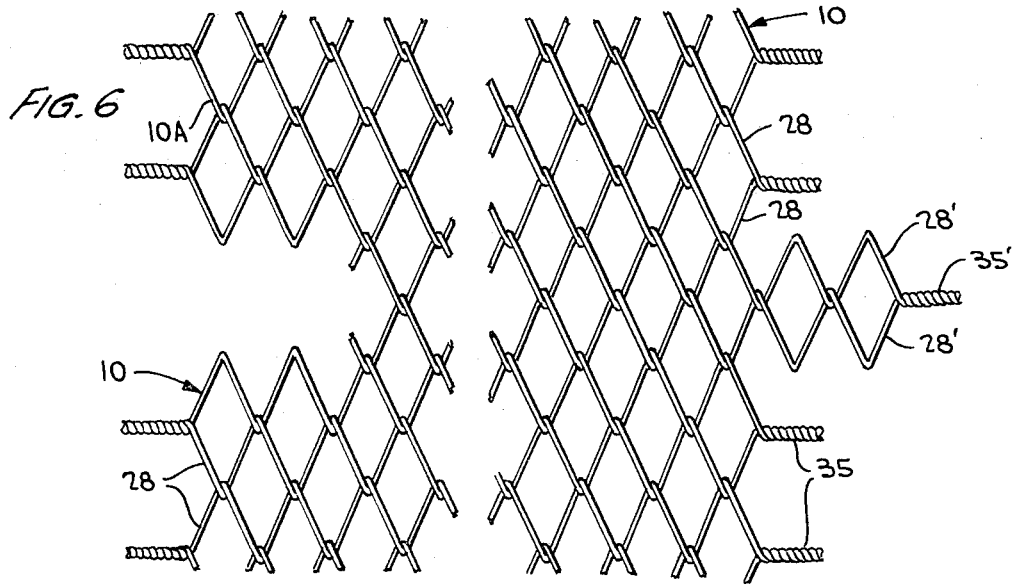
FIGURE 6 is a somewhat diagrammatic fragmentary instantaneous view in plan of the web with a pair of coils at a point where they are partially unwound from the web.

Finally, so far as this brief introductory description of the operation is concerned, FIGURE 6 indicates an instantaneous position of the double coil 28' after it has been unscrewed or untwisted for about two turns. It will be clearly understood that further movement of the tool will withdraw the double separating coil 28' entirely from the web, thus leaving the web section 10A of the required dimensions; and of course the new head end of the continuing web 10 is then advanced to the gauge stop 13 and the severance procedure repeated.

With this broadly described process in mind, the mechanism and detailed steps will now be described.

Secured in any feasible manner to one edge of the table or bench 12 is the vertically extending bracket member 50. Spaced outwardly from the table a distance somewhat greater than the width of the web of mesh is a similar vertically extending bracket 51, the two brackets being joined by the guide bar, preferably of rectangular tubing, designated 52. The outer bracket 51 is preferably additionally supported by an angle post 54.

Rigidly clamped at its ends within openings in the brackets 50 and 51 is the screw shaft 55. This screw shaft is a mating element to the travelling nut assembly 56 and these parts together form a ball bearing screw and nut assembly such as the well known types put out by the Saginaw Steering Gear Division of General Motors Corporation and disclosed in its Design Guide (eighth ed.) 1964. Such devices are also disclosed in numerous patents, among which may be cited purely as a generic example, the patent to Phelps et al. 2,159,225, granted May 23, 1939.

The nut portion 56 of the device is of course provided with internal spirals matching the external grooving of the screw shaft 55 and equipped with a train of ball bearings which may pass from end to end of the nut 56 through the transfer tubes 57 and 58.

The nut 56 constitutes part of a travelling carriage designated by the general reference numeral 60 and including an angular locating plate 62. The plate 62 is provided at its elbow portion with an opening into which a flange of the bearing supporting ring 64 is inserted. Inwardly of these parts there is disposed a flanged guide member 65 and all of these parts 62, 63 and 65 are rigidly secured together as by means of the screws or bolts 66.

The guide member 65 is provided with an axial nipple portion 67 which may be provided with a liner 68 which slidingly embraces the screw shaft 55. Within the flanged ring 64 there is disposed the bearing sleeve 70, a tubular portion of which is spaced from the inner surface of the annular flange of the ring 64 to receive the ball bearing assemblies 72, the outer races of which are supported in non-rotatable position by the ring 64 which in turn is of course secured to the locating plate 62. The inner races of the ball bearing assemblies are secured to the bearing sleeve 70 which is in turn rigidly connected with the travelling nut 56 in the following manner. One protruding end of the nut assembly 56 is threaded as at 74 and tightly screwed thereon is the flange 75. This flange is bolted to the bearing sleeve 70 as at 76 and two pulleys 78 and 80 are disposed in parallel relation against either face of the flange 75 and secured thereto as by means of the bolt 81.

Against the inner face of the downwardly extending vertical arm of the locating plate 62, there is bolted a pneumatic or air motor 100, a shaft 101 of the motor extending through an opening in the plate 62 and carrying upon its outer end a pulley 102 which is disposed in substantially the same plane as the pulley 78. At 107 are suggested air connections leading to and from the air motor 100 and controlled by a pneumatic system to be described presently.

This vertical leg of the angular plate 62 is provided with a mounting block 110 for the guide rollers 112 which straddle the rectangular tubular guide bar 52 and this arrangement serves to guide the entire carriage 60 in its straight line reciprocating movement toward and from the table 12 during operation.

The laterally extending arm 113 of the plate 62 is provided with a cylindrical cap member 114 and within these parts there are disposed the bearing assemblies 115 within which the tool shaft 116 rotates. Upon the end of this shaft 116 is carried the tool head 20, the parts being secured together as, for example, by means of the set screw 118.

Upon the opposite end of the tool shaft 116 there is carried the pulley 120 which is disposed within the plane of the pulley 80 already described.

The motor pulley 102 drives the pulley 78 by means of the belt 124 and the pulley 80 which is rigid with the pulley 78 serves to drive the tool shaft pulley 120 by means of the belt 125.

Thus it will be seen that upon the actuation of the air motor 100 in the untwisting direction, the carriage 60 with all of its attendant parts including the tool head 20, will move outwardly, retreating from the bench or table 12 as the nut 56 spirals along the screw shaft 55. At the same time that the nut is driven by the motor the pulley 80 through the belt 125 rotates the tool shaft 116 and the tool head 20 to unwind or unscrew the twin coils 28'.

Obviously, the pitch of the helical movement of the tool head 20 under the influence of its rotation and the travel of the nut 56 and the carriage 60 along the screw shaft 55 should be the same as the pitch of the configuration of the coils 28' which are to be removed from the mesh. In one example of the formation of seat cushion spring pads of the type mentioned, the pitch of the coils is 0.718", that is, a longitudinal movement of approximately three-quarters of an inch for every rotation of the head.

A preferred configuration of the tool head 20 is shown in FIGURES 1, 3, 4, and 5 of the drawings. The forward or operative end of the cylindrical tool 20 is drilled out as at 130 and the opening into this drilled-out portions is funneled in a somewhat conical fashion as suggested at 132 in FIGURE 3. The annular forward face of the tool is of irregular configuration having concavities 133 and 134 at opposite sides thereof, and at the high points of the front face of the tool the junctions of these concave areas 133 and 134 are configured to form projecting curved tongues or hooks 135 facing in opposite circular directions.

Figure 1:
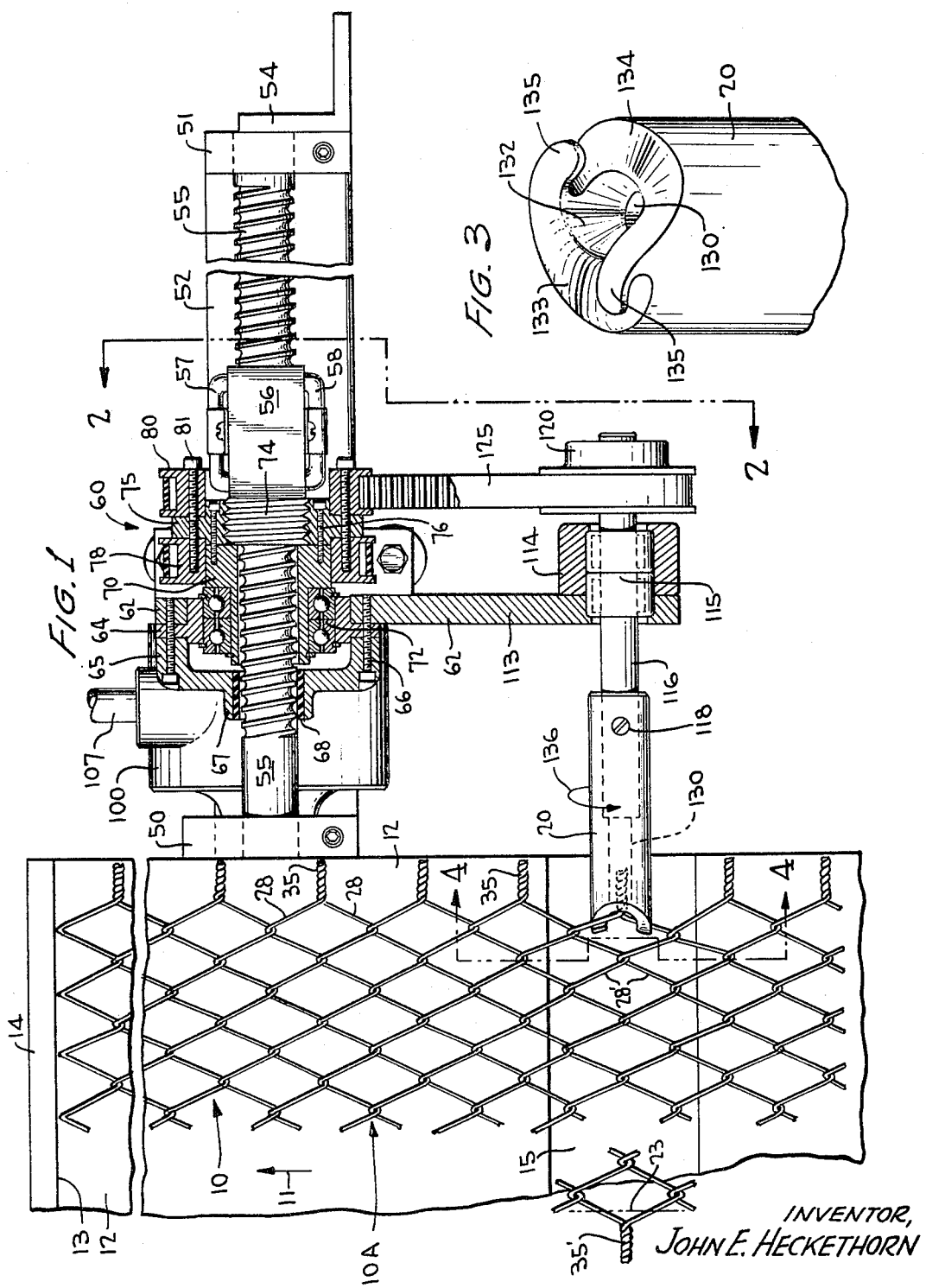
FIGURE 1 is a plan view partly in section illustrating one embodiment of the apparatus phase of the invention as applied to a web of mesh laid upon a table or other flat supporting surface.
Figure 2:
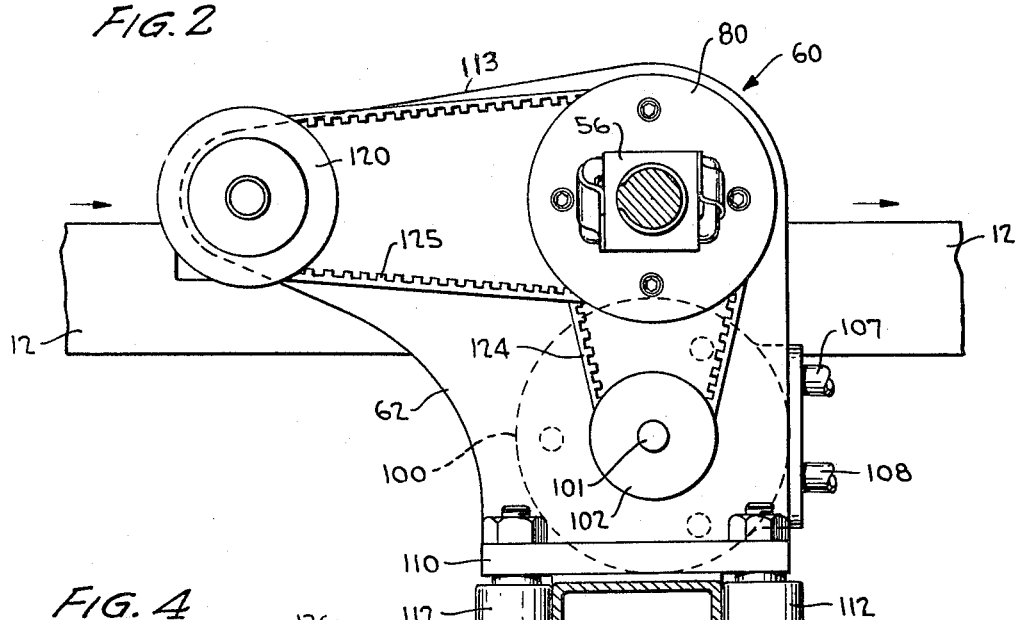
FIGURE 2 is a view in vertical section taken on line 2—2 of FIGURE 1.

These hooks are adapted to engage the converging convolutions of the pair of coils 28' as clearly shown in FIGURES 1, 4 and 5 and rotate the twin coils as the tool is rotated in the direction of the arrows 136. The engagement of the hooks 135 with the coils 28' is effected approximately simultaneously with the descent of the cutting knife D at the line 23 at the opposite side of the web.

It will be readily apparent how the conical or funnel shaped mouth of the bore of the tool serves as a centering and positioning means for guiding the tool accurately onto engagement with the convergent end convolution of the double coil 28'. Thus the coils can be removed at extremely high speeds and without danger of tangling.

It will be understood that when the carriage 60 and the tool head 20 reach the outer limit of their movement, the coil 28' are then clear of the remainder of the mesh web and of the table 12 and at this point, or at least shortly after the tool is turned in a reverse direction, the withdrawn coils 28' fall to the floor.

The mode of operation of the device, including initiating the starting and stopping of the cycles and an automatic reversal of the carriage, will now be described in connection with the pneumatic circuitry suggested in FIGURE 7.

At A in this figure is indicated a source of compressed air and in the line leading from the source A there may be disposed a safety shut-off valve B. The compressed air is fed from the source into a main pressure line designated $a$ and connected to this line as by means of the line $a'$ is the pilot air line $b$ and the pilot actuating line $b'$.

In this diagram the motor 100 is indicated as moving to and fro on the lead screw 55 and adjacent the ends of travel of the motor are positioned the limit valves E and F; the valve E may be designated a stop valve and the valve F a reversing valve.

The cutting device for severing the coils to be removed along the line 23 (FIGURE 1) is suggested diagrammatically at D and is carried by a piston CP working in a cylinder C. At K is indicated the cutter control valve.

A valve J controls the motor itself and a compound start valve assembly is indicated at G and may comprise two separate valve units H and I.

In the case of these controlling valves which are all multiple valves, the discharge or fluid directing ports are in general indicated by the reference numeral 1, the exhaust ports by the reference numeral 2, and the pressure ports by the numeral 3. In the case of the main motor and cutter controlling valves additional ports are indicated at 4, 5, 6 and 7. In the diagram, speed control or governor valves R are inserted adjacent the operative members to regulate the flow of motive fluid in accordance with the rate of movements desired.

In practice, the operator positions the leading end of the web 10 against the gauge stop 13 while the separator tool 20 is returning to its starting position. By the time the tool has fully returned, the operator has the mesh correctly positioned and disposed with the ends of the coils 28' in position beneath the cutting tool D at the line of severance 23. The air motor 100 or any adjacent part of the carriage 60 trips the trigger of the stop valve E to open position shutting off the air supply to the motor, the motor resting against the valve trigger as indicated at the left in FIGURE 7. The tool 20 has then engaged the twisted end of the double coil 28'.

When the mesh is properly positioned, the operator actuates the valve system G as by depressing a foot pedal and this action connects the air supplying port 1 of the valve members H with the main pressure intake port 3. Valve I exhausts the pilot actuating line $b'$ through the ports 1 and the open port 3 of the valve I, and this releases the pilot actuator $K_p$ of the cutter control valve K and connects the pressure supply port 1 of the valve K with the port 6 to cause the cutter piston CP to move downwardly in the cylinder C and effect the severance of the coils by means of the cutting device D.

At the same time the pilot actuator $J_p$ of the motor control valve J is relieved and the valve is shifted to motor forward position, say for example, by connecting the ports 1 and 4 of the valve J. The pressure air moves through the ports 3 and 1 of the valve H and into the motor control valve J and drives the motor in its forward or outward direction to unwind the coils.

As the motor moves away from the stop valve E and the foot actuated starting valve H–I is released, the pressure air moves through the ports 3 and 1 of the valve E and on through the ports 2 and 1 of the valve H, thus supplying the air to the valve J to keep the motor running. It is to be noted that this action occurs so rapidly that it is usually difficult to detect any hesitation in the rotation of the motor. As the valve combination H–I is released the ports 1 and 2 of the valve I are placed in communication, but since the "exhaust" port 2 of the valve I is plugged, the remote end of the pilot actuating line $b'$ is sealed.

Figure 7:
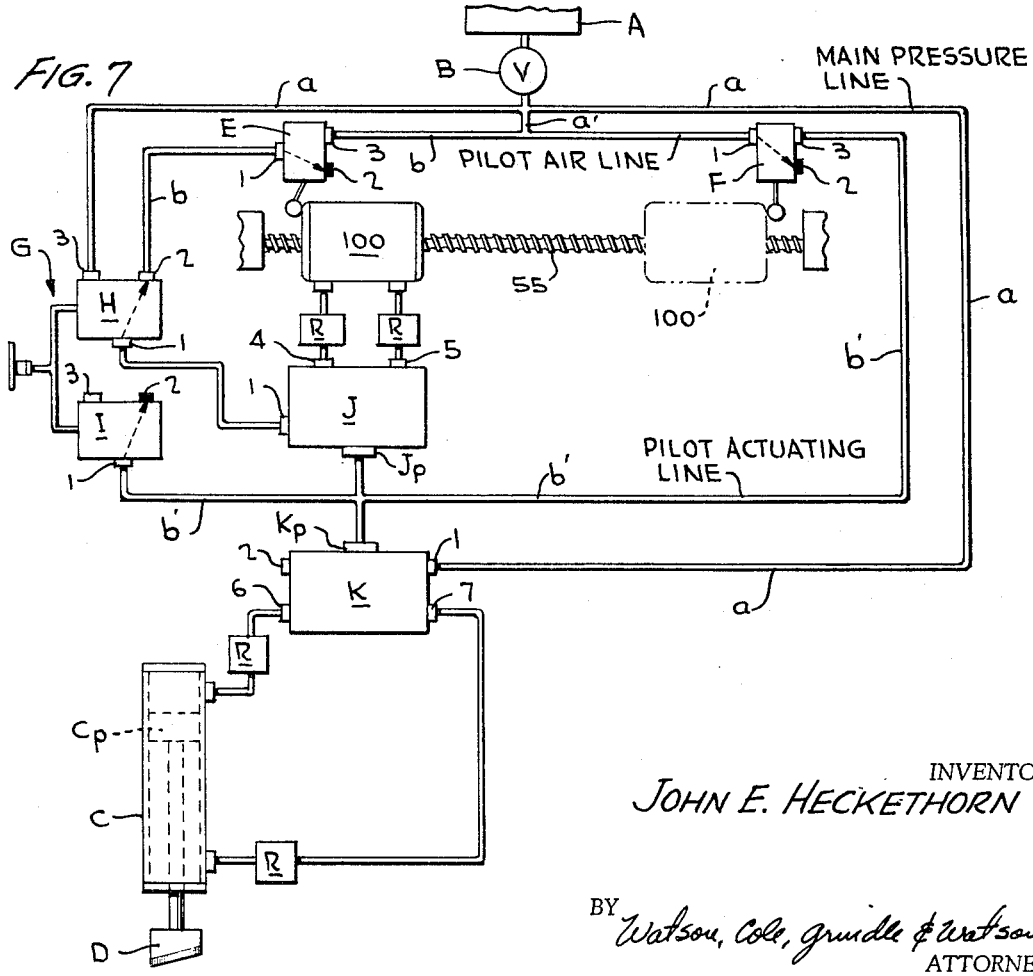
FIGURE 7 is a diagram of the pneumatic circuitry involved in the partly manual and partly automatic operation of the unwinding motor and the coil severing cutter device.

When the carriage 60 and motor 100 reach the end of the outward or unwinding stroke as at the position indicated in dotted lines in FIGURE 7, when the coils are fully extracted, they trigger the normally closed valve F admitting pressure air into the pilot actuating line $b'$ from the pilot air supply line $b$. Thus, the valve J is operated through the pilot or actuating portion $J_p$ to connect the intake port 1 of that valve with the reverse port 5 of the valve, thus effecting the reversal of the air motor 100. At the same time the pilot $K_p$ of the cutter valve K is actuated to connect the intake 1 from the main pressure line with the port 7 which retracts the piston CP and opens up the cutter D. Then again as the motor moves the carriage inwardly the reversing valve F closes by placing the inlet port 1 in communication with the plugged exhaust port 2 thus sealing off the air in the pilot actuating line $b'$.

Again, when the carriage reaches the end of the return stroke it contacts the stop valve E connecting the ports 1 and 2 thereof. Since the port 2 is plugged, the pressure air already in the motor line is sealed in and the motor stops, firmly resting against the actuator of the valve E. This gives a quite solid and precise stopping action to the spindle and tool head.

In normal operation, the cycle is repeated manually at this point with the carriage remaining in stopped position only for an instant. If the operator, for one reason or another, is not ready to repeat the cycle, the pilot actuating line $b_1$ will "bleed" down in a few seconds and the cutting device will actuate of its own accord. This is attributable to a minute leakage provided in the valve I and this provision is of no disadvantage to the operation of the device and even helps to "pace" the operator in his over-all procedures.

It is understood that various changes and modifications may be made in the embodiment illustrated and described herein without departing from the scope of the invention as determined by the subjoined claims.

Having thus described the invention, what is claimed as new and desired to be secured by Letters Patent is:

1. The method of separating a continuous woven wire mesh web structure into smaller sections, said web structure being composed of a series of parallel convoluted wire coils of substantially uniform predetermined approximately helical configuration, the convolutions of adjacent parallel coils being interlocked by interthreaded engagement with each other, said method comprising supporting said web structure with at least one of its lateral margins accessible, seizing the end of a coil at one margin of said web structure at the point of desired separation along the web structure, rotating said coil in the direction opposite to that of the substantially helical winding of the coils, while at the same time drawing said coil outwardly of the web structure, substantially in the plane of the latter, the rate of advance of the rotary and longitudinal movement of the coil being substantially equal to the pitch of the coil winding, and releasing the coil as it is completely disengaged from the web structure.

2. The method according to claim 1 in which a pair of adjacent coils at the point of desired separation along the web structure is seized and rotated as an integral unit, resulting in the removal of both coils in effecting the separation of such sections.

3. The method as set forth in claim 2 in which said adjacent pairs of coils in the web are rigidly secured together at their ends by intertwisting the wire end portions, and the process includes the steps of severing the intertwisted ends of a pair of coils at one side of the web, and then effecting said seizing and withdrawal at the opposite side of the web at a point adjacent the intertwisted ends at said latter side.

4. The method as set forth in claim 3 in which said seizing is effected by inserting said last named intertwisted coil ends into an axial recess in a rotatable tool, engaging the adjacent end convolutions of said pair of coils with radially extending portions of said tool and rotating said tool while bodily moving it in an axial straight line path laterally of said web, discontinuing the movement of said tool when the wire coils have been unthreaded from the web structure and said pair of coils has been released, and returning the tool to said web for repeat action at a succeeding point of severance.

5. Apparatus for separating a continuous woven wire mesh web structure into smaller sections, said web structure being composed of a series of parallel convoluted wire coils of substantially uniform predetermined approximately helical configuration, the convolutions of adjacent parallel coils being interlocked by interthreaded engagement with each other, said apparatus comprising means for supporting said web structure; a tool for engaging an end of at least one coil of said structure at the point of desired separation along the web structure, and at one side margin of said structure; a carriage movably mounted adjacent said supporting means; means for guiding said carriage for bodily reciprocating movement toward and from said web structure at one side thereof; means for rotatably mounting said tool on said carriage substantially in the plane of the web structure; means on said carriage for rotating said tool and at the same time travelling said carriage in the direction away from said web structure to unwind said coil from its interthreaded engagement with adjacent coils of the structure, and at a rate corresponding to the helical pitch of the coil convolutions.

6. The apparatus as set forth in claim 5 in which means for movably mounting said carriage are provided comprising a fixed threaded shaft disposed alongside of and extending in a plane parallel to said web structure and in a direction perpendicular to the margin of the latter; a nut device rotatably carried by said carriage but restrained from axial movement with relation thereto; means for rotating said nut and simultaneously rotating said tool in conformity with the predetermined pitch of the coil convolutions.

7. The apparatus as set forth in claim 6 in which motor means is carried by said carriage and transmission means on the carriage connects said motor means with said tool and said nut.

8. The apparatus as set forth in claim 5 in which the approximately helical configuration of said coils is such that they are wider in the direction of length of the web structure than in the direction of the thickness of said structure, and in which said apparatus includes a bench for supporting said web structure, a gauging end stop on said bench for abutment by the current end of said structure, and a transverse gap in the surface of said bench beneath the position of the coil to be removed, said gap affording accommodation of the greater dimension of the coil during the unwinding procedure.

9. The apparatus as set forth in claim 6 in which said carriage comprises a bracket plate surrounding said threaded shaft; and said guiding means comprises a rectilinear bar and follower means on said plate disposed in moving contact with said bar, and a tubular guide carried by said plate in snug sliding fit with said threaded shaft; and bearing means is provided between said bracket plate and said nut device.

10. The apparatus as set forth in claim 9 in which motor means is carried by a portion of said plate and said tool by another portion of the plate, and in which the transmission means comprises a pair of parallel pulleys rigidly carried by said nut device; a pulley carried by said motor and a belt connecting said last named pulley to one of said parallel pulleys; a pulley carried by said tool and a belt connecting said tool pulley with the other of said parallel pulleys; the ratio of sizes of said pulleys being such as to drive the tool according to the said pitch of the coils.

11. The apparatus as set forth in claim 5 in which there are provided limit devices positioned in the path of travel of said carriage at both terminals thereof, means actuated by the tripping of one of said limit devices for reversing the rotation of said motor at the end of the unwinding travel of the carriage, and means actuated by the tripping of the other of said limit devices for at least momentarily stopping the motor at the end of its return travel for the re-positioning of the web structure for repeat operation.

12. The apparatus as set forth in claim 5 in which each coil is fixedly connected with an adjacent coil in the web structure, and there is provided a cutting device adjacent the opposite margin of the web structure for severing such connection prior to withdrawal movement of the tool.

13. The apparatus as set forth in claim 11 in which each coil is fixedly connected with an adjacent coil in the web structure, and there are provided a cutting device adjacent the opposite margin of the web structure for severing such connections prior to withdrawal movement of the tool, and automatic means for actuating said cutting device upon the tripping of the second described limit device.

14. The apparatus as set forth in claim 5 in which adjacent pairs of coils are rigidly secured together adjacent at least one margin of the web structure by the intertwisting of the wire end portions to provide an axial projection of intertwisted wires, in which the tool has an axial recess in its operative end to receive said intertwisted axial projection for centering purposes, and the tool has diametrically opposite hook portions at said operative end, said hook portions projecting in opposite directions and adapted to engage portions of said interconnected coils diverging from said projecting intertwisted ends.

References Cited

UNITED STATES PATENTS

| | | | |
|---|---|---|---|
| 1,952,413 | 3/1934 | Brandivein | 140—92.9 |
| 2,298,266 | 10/1942 | Bachleda | 29—227 |
| 3,019,517 | 2/1962 | Lovecky | 140—124 |

CHARLES W. LANHAM, *Primary Examiner.*

L. A. LARSON, *Assistant Examiner.*